(12) United States Patent
Setlur (10) Patent No.: US 9,400,835 B2
(45) Date of Patent: Jul. 26, 2016

(54) WEIGHTING METRIC FOR VISUAL SEARCH OF ENTITY-RELATIONSHIP DATABASES

(75) Inventor: Vidya Setlur, Portola Valley, CA (US)

(73) Assignee: Nokia Technologies Oy, Espoo (FI)

( * ) Notice: Subject to any disclaimer, the term of this patent is extended or adjusted under 35 U.S.C. 154(b) by 146 days.

(21) Appl. No.: 13/193,533

(22) Filed: Jul. 28, 2011

(65) Prior Publication Data

US 2013/0031126 A1 Jan. 31, 2013

(51) Int. Cl.
*G06F 17/30* (2006.01)

(52) U.S. Cl.
CPC .... *G06F 17/30604* (2013.01); *G06F 17/30554* (2013.01)

(58) Field of Classification Search
CPC .............. G06F 17/30554; G06F 17/30604; G06F 17/30244
USPC .................................. 707/758, 769
See application file for complete search history.

(56) References Cited

U.S. PATENT DOCUMENTS

| | | | |
|---|---|---|---|
| 5,615,112 A * | 3/1997 | Liu Sheng et al. | |
| 6,453,302 B1 * | 9/2002 | Johnson et al. | 705/27.2 |
| 7,047,386 B1 * | 5/2006 | Ngai | G06F 9/5016 707/999.202 |
| 7,483,618 B1 * | 1/2009 | Edwards | G11B 27/034 386/248 |
| 2001/0034588 A1 * | 10/2001 | Agrawals | G01C 21/36 703/2 |
| 2002/0194379 A1 * | 12/2002 | Bennett et al. | 709/246 |
| 2003/0110181 A1 | 6/2003 | Schuetze et al. | |
| 2005/0076060 A1 * | 4/2005 | Finn et al. | 707/104.1 |
| 2006/0200759 A1 * | 9/2006 | Agrawala | G06F 17/211 715/209 |
| 2007/0058884 A1 * | 3/2007 | Rother | G06T 11/60 382/284 |
| 2007/0098266 A1 * | 5/2007 | Chiu et al. | 382/224 |
| 2007/0192164 A1 * | 8/2007 | Nong et al. | 705/10 |
| 2007/0239686 A1 | 10/2007 | Quinn-Jacobs | |
| 2008/0104032 A1 * | 5/2008 | Sarkar | 707/3 |
| 2008/0183695 A1 * | 7/2008 | Jadhav | 707/5 |
| 2009/0027392 A1 | 1/2009 | Jadhav et al. | |
| 2010/0063876 A1 * | 3/2010 | Godden et al. | 705/14.43 |
| 2010/0248741 A1 | 9/2010 | Setlur et al. | |
| 2011/0125739 A1 | 5/2011 | Wexler et al. | |

OTHER PUBLICATIONS

Kamada, T., et al.; "An Algorithm for Drawing General Undirected Graphs"; Information Processing Letters; vol. 31; Apr. 1989; pp. 7-15.
Tamassia, R.; "Constraints in Graph Drawing Algorithms"; Journal of Constraints; vol. 3; Issue 1; Apr. 1998; pp. 87-120.
Wu, X., et al.; "InGRAPH: graphical interface for a full object-oriented database system"; Proceedings of the 1993 ACM/SIGAPP Symposium on Applied Computing; New York, NY; pp. 318-325.
International Search Report and Written Opinion from International Patent Application No. PCT/FI2012/050558, mailed Nov. 14, 2012.

\* cited by examiner

*Primary Examiner* — Shiow-Jy Fan (74) *Attorney, Agent, or Firm* — Alston & Bird LLP (57) ABSTRACT

The semantics of a relational database may be modeled using an entity-relationship (ER) diagram that represents entities and the relations between the entities. Systems and methods are provided for automatically composing meaningful thumbnails/composited images or visuals from ER diagrams and their associated databases by using the semantics of the underlying data model. First, the most meaningful relations in which a given data element participates are extracted. Second, composited images are composed depicting these relations using a domain-specific visual language and rendering techniques based on the relative weighting of the relations.

16 Claims, 7 Drawing Sheets

$$\begin{bmatrix} 2 & -1 & 0 & -1 & 0 \\ -1 & 1 & 0 & 0 & 0 \\ 0 & 0 & 1 & 0 & -1 \\ -1 & 0 & 0 & 1 & 0 \\ 0 & 0 & -1 & 0 & 1 \end{bmatrix}$$

WEIGHTING METRIC FOR VISUAL SEARCH OF ENTITY-RELATIONSHIP DATABASES

TECHNICAL FIELD

The present application relates generally to relational database information visualization and retrieval and, more particularly, to generating semantically meaningful visual representations for underlying entity-relationship (ER) data.

BACKGROUND

The explosion in the number of online relational databases has created a growing interest in leveraging relevant, high-quality information present in these relational databases. However, a number of factors affect the degree of benefit end-users can derive from such databases, including, e.g., how well the database has been designed, retrieved, and presented.

Relational database design has evolved from what was once an "artistic" endeavor to a scientific one. This evolution in relational database design has been made possible with certain vendor-supplied tools that aid a developer in designing the most efficient databases possible. Many of these tools offer interactive modeling capabilities using a simplified data modeling approach. However, while these tools may help create an optimized, efficient database, end-users often have difficulty understanding the meaning inherent in a database's conceptual model, leading to a lack in ontological clarity.

One standard and efficient method of retrieving information from relational databases may be referred to/described as systematic retrieval. That is, the needs of an end-user, e.g., data being sought by the end-user, are described in a formal query, and a database management system retrieves the desired data. There are several situations, however, where systematic retrieval fails to provide an optimal experience for the end-user. For example, an end-user may not be familiar with the principles employed by the database management system to organize data (the data model) or the definition (schema) of the particular database to be accessed. Oftentimes, an end-user's retrieval target is vague, e.g., the end-user is merely looking for something interesting or suitable for some purpose, rather than a specific target or piece of data. Alternatively, the end-user may simply fail to provide sufficient information that will result in a fruitful query. To wit, studies have found that the average number of keyword terms per query that end-users provide in a Google search is merely about 2.286 terms.

In addition to tools and algorithms that assist in the development of databases and the subsequent retrieval of information from the databases, a variety of systems also exist that have begun to bring together the advantages of information visualization and current information retrieval technology. Visual representations of data may significantly enhance a user's ability to understand these complicated relations and underlying structures in such relational databases. Some visualization interfaces for information retrieval systems visualize ranked, query-document similarity and clustering. Research regarding such visualization interfaes generally falls into the categories of data visualization and semantic information presentation. However, while most research focuses on visualizing data from an analytical point of view, end-users often rely on database searches for better recall and engagement.

In the area of data visualization, some research is being/has been conducted regarding the automatic rendering of entity-relationship diagrams. An example of such research is a text entitled "Constraints in Graph Drawing Algorithms," by Roberto Tamassia, *Constraints* Volume 3, Number 1 (April 1998). Other research is directed to the presention of a graphical browser or interface for relational databases, such as the article entitled "InGRAPH: graphical interface for a fully object-oriented database system," by Xuequn Wu and Guido Dinkhoff, In *Proceedings of the* 1993 *ACM/SIGAPP symposium on Applied computing: states of the art and practice* (SAC '93. The text "An Algorithm for Drawing General Undirected Graphs," by Tomihisa Kamada and Satoru Kawai, *Information Processing Letters*, 31:7-15, 1988 presents a visualization framework for translating abstract objects and relations, typically in textual forms, into pictorial representations. In this framework, abstract objects and relations are mapped to graphical objects by user-defined mapping constraints. However, such research has been focused on merely the analytical aspects of making these relationships clearer, rather than focusing on end-user consumption.

SUMMARY

Various aspects of examples of the invention are set out in the claims.

According to a first aspect, a method comprises locating at least one data element matching a user query of a database; extending results of the user query with relevant data elements, if necessary; locating images for a result set; and creating a composited image from domain-specific visual templates in response to the user query.

According to a second aspect, an apparatus comprises at least one processor and at least one memory. The at least one memory includes computer program code, the at least one memory and the computer program code configured to, with the at least one processor, cause the apparatus to perform at least the following: locate at least one data element matching a user query of a database; extend results of the user query with relevant data elements, if necessary; locate images for a result set; and create a composited image from domain-specific visual templates in response to the user query.

According to a third aspect, a computer-readable memory includes computer executable instructions, the computer executable instructions, which when executed by a processor, cause an apparatus to locate at least one data element matching a user query of a database; extend results of the user query with relevant data elements, if necessary; locate images for a result set; and create a composited image from domain-specific visual templates in response to the user query.

According to a fourth aspect, a method comprises representing a relational database utilizing an entity-relationship diagram; calculating global weights and centrality scores for each entity of the relational database; and utilizing domain-specific visual templates for creating a composited image in response to a user query of the relational database.

According to a fifth aspect, a computer-readable memory includes computer executable instructions, the computer executable instructions, which when executed by a processor, cause an apparatus to represent a relational database utilizing an entity-relationship diagram; calculate global weights and centrality scores for each entity of the relational database; and utilize domain-specific visual templates for creating a composited image in response to a user query of the relational database.

According to a sixth aspect, an apparatus comprises at least one processor and at least one memory. The at least one memory includes computer program code, the at least one memory and the computer program code configured to, with the at least one processor, cause the apparatus to perform at least the following: represent a relational database utilizing an entity-relationship diagram; calculate global weights and centrality scores for each entity of the relational database; and utilize domain-specific visual templates for creating a composited image in response to a user query of the relational database.

BRIEF DESCRIPTION OF THE DRAWINGS

For a more complete understanding of example embodiments, reference is now made to the following descriptions taken in connection with the accompanying drawings in which.

DETAILED DESCRIPTION OF THE DRAWINGS

Example embodiments and their potential advantages are understood by referring to FIGS. 1-7 of the drawings.

Various embodiments are directed to the automatic creation of improved semantic visual representations for relational database management systems (RDBMSs). RDBMSs refer to a class of databases that is inherently popular given its simple data model, wherein data is presented as a collection of entities and relationships. In terms of creating this type of data model, database designers first identify principal entities, i.e., key objects that would appear in the database schema. These entities are typically people, places, things, or events, and may be characterized as some thing that is understood/recognized as being able to support an independent existence, as well as being uniquely identifiable, i.e., an abstraction from the complexities of a domain. Attributes are then associated with these entities as descriptors. A relationship represents an association between two or more entities (e.g., actors act in movies, where actors and movies are entities). Each entity is depicted as a table, where the corresponding columns of the table are representative of attributes. Thus, each table has a set of attributes that taken together as a "key" (or more precisely, a "superkey"), uniquely identifies each entity. This ER model is a way of conceptualizing a relationship database view. It should be noted that although relational databases and RDBMSs are discussed herein, various embodiments may be applied/adapted for use with other types of databases and database management systems that have some form of "entity" aspect having at least a 1-1 relationship with one another, e.g., flat model databases, star schema databases, object-relationship model databases, etc.

Massive amounts of data are stored in relational databases and in recent years, these databases have increasingly become available online. The semantics of a relational database may be modeled using an ER diagram that represents entities and the relations between the entities. In accordance with various embodiments, systems and methods are described for automatically composing meaningful thumbnails/composited images or visuals from ER diagrams and their associated databases by using the semantics of the underlying data model. That is, systems in accordance with various embodiments are capable of generating more semantically meaningful visual representations for the underlying entities and their relationships in database schemas than current and/or conventional systems.

A database system in accordance with one embodiment may have two operational concepts. A first operational concept involves extracting the most meaningful relations in which a given data element participates. A second operational concept involves composing images depicting these relations using a domain-specific visual language and rendering techniques based on the relative weighting of the relations. The images used in the compositing aspect may be present in the database or extracted from another/external database, e.g., publicly available sources such as personal homepages, Flickr®, etc. For example, if a message relationship exists between two entities, e.g., people, the database system may compose an image showing two people engaged in a dialog. Such a database system may be applied to various databases, including but not limited to databases such as Wikipedia®, Internet Movie Database (IMDb®), as well as structured data such as mobile phone call logs.

At its core, and as alluded to previously, an ER model is an abstract and conceptual representation of data that may be used to produce some type of a semantic data model of a system (i.e., a model capable of describing the meaning of its instances), such as a relational database. Diagrams created using ER modeling are referred to as ER diagrams. An ER diagram views the real world as a construct of entities with attributes and associations or relationships between entities. These relationships are classified by their degree, connectivity, cardinality, direction, type and existence. These classifications affect the weighting of the different elements that compose visual search results of a user query.

The degree of a relationship refers to the number of entities associated with the relationship. The degree is typically a binary value in most databases. The connectivity of a relationship describes the mapping of associated entity instances in the relationship, whereas the cardinality of a relationship is the actual number of related occurrences for each of the two entities. The direction of a relationship indicates the originating entity of a binary relationship, where the entity from which a relationship originates is referred to as the parent entity, and the entity at which the relationship terminates is referred to as the child entity. Additionally, entities may also be classified into independent (strong) or dependent (weak) types depending on whether they can exist on their own or only in the presence of another entity, respectively.

In accordance with one embodiment, two algorithms are utilized to achieve the database system. A first algorithm computes individual weights of entities and relationships that comprise the semantics of a relational database. A second algorithm uses image compositing techniques that take a ranked list of relationships and a set of domain-specific visual templates to composite a compelling image based on the top of N templates.

Figure 1A:
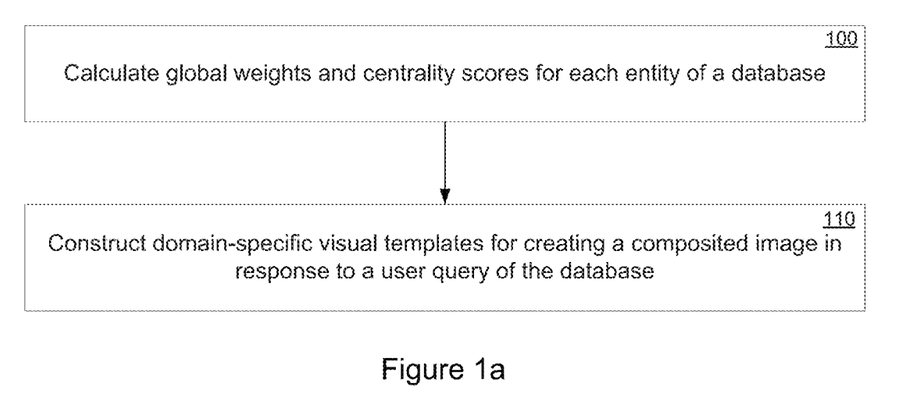
FIGS. 1a and 1b are flow charts illustrating exemplary processes performed to create meaningful visual representations for underlying ER data of a database.

FIG. 1a is a flow chart illustrating exemplary processes performed as part of a one-time pre-processing procedures to properly "configure" or "prep" a database. At 100, global weights and centrality scores are calculated for each entity of a database. As will be described in greater detail below, the global weights are representative of the importance of a particular entity type to a dataset as a whole. It should be noted that ER diagrams are generally utilized, not to show single entities/relation instances, but rather datasets such as entity sets and relationship sets. The centrality scores, as will also be described in greater detail below, are a measure of each individual data element's importance to the data, i.e., a scaling factor for the global weight of an entity type. At 110, domain-specific visual templates are constructed for creating a composited image in response to a user query of the database.

Figure 1B:
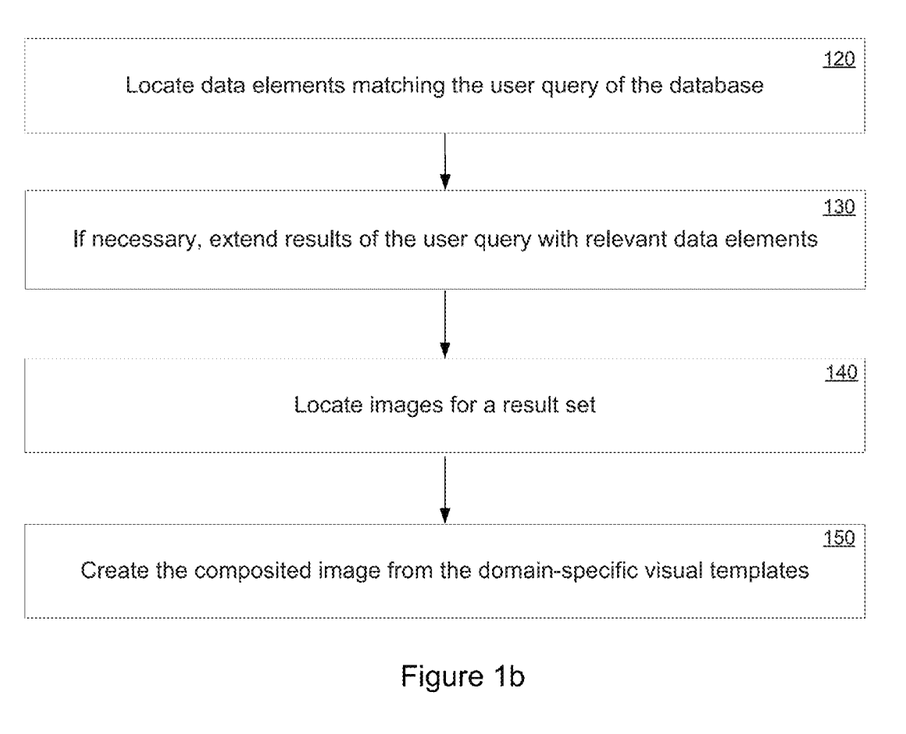

FIG. 1b is a flow chart illustrating exemplary processes performed each time a user is received at a database in accordance with various embodiments. Again, the database will have been configured/prepped in accordance with the processes of FIG. 1a. At 120, data elements matching the user query of the database are located. At 130, and if necessary, results of the user query are extended with additional relevant data elements. Regardless, once the data elements satisfying the user query have been found, images are located for the result set at 140. At 150, the composited image is created from the domain-specific visual templates. That is, the images that were located for the result set at 140 are used in creating the composited image, the images being composited in accordance with the requisite template(s).

As indicated previously, entity weights are calculated. To compute the weighting, a normalized database schema is utilized. Data normalization refers to a process of structuring data based on certain design constraints for minimizing data redundancy and inconsistencies. Databases in higher normal forms tend to express a reduced amount of data inconsistency arising from delete, insert and update anomalies.

Figure 2:
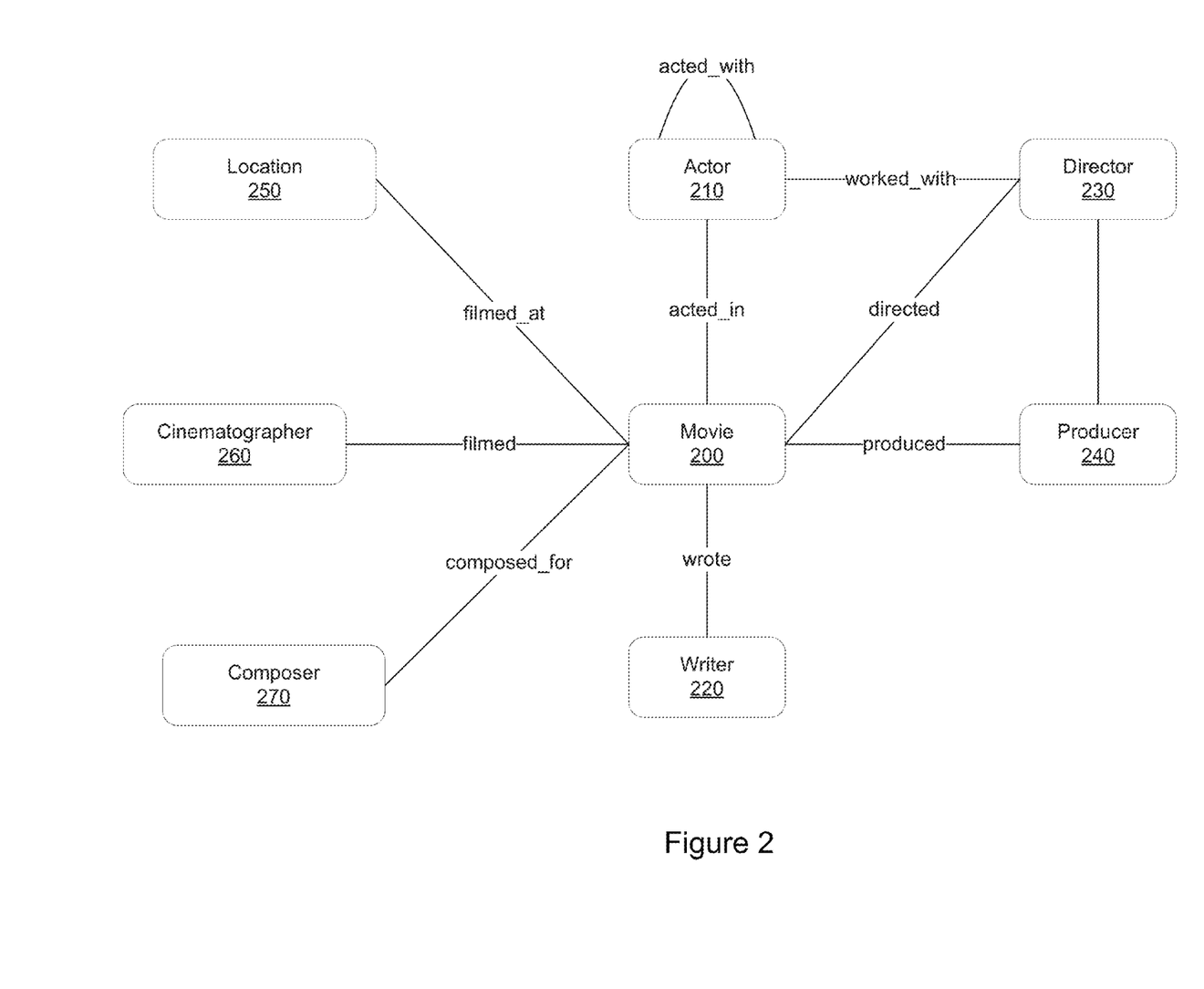
FIG. 2 illustrates an exemplary ER diagram in accordance with one embodiment.

For example, a normalized database schema of the IMDb® is shown in FIG. 2. One side effect resulting from normalization is the existence of several extraneous entity tables such as "acts in," "writes," and "produces" entity tables (not shown). This is because that certain entities such as the Movie entity 200 and the Actor entity 210 have a many-many relationship, i.e., each actor may act in many movies, and each movie can have many actors.

Additionally, certain multi-value movie attributes such as "plot," "quotes," and "mpaa-rating-reason" (not shown) may be made into separate entities creating a false perception of the different types of "true" entity-relationship combinations. Hence, a more natural representation of the database semantics is utilized, similar to an ER diagram. The ER diagram, such as that illustrated in FIG. 2 is typically created at the database design stage by domain experts, and can be tailored to the type of information a user would like to retrieve from such a database.

Given the centrality of the Movie entity 200, a barebones ER diagram may have a relationship between each entity (e.g., Director entity 230, Producer entity 240, Actor entity 210, Writer entity 220, Location entity 250, Cinematographer entity 260, and Composer entity 270) and the Movie entity 200. Examples of these basic relations include a "directed" relation or "acted_in" relation. Yet other examples illustrated in FIG. 2 include, but are not necessarily limited to the following relations: "worked_with;" "filmed_at;" "filmed;" \ and "wrote." However, these relations may be supplemented with additional relations tailored to a specific task. For a site such as IMDb® that is, e.g., primarily focused on the relationship between actors and movies, a domain expert might supplement a basic ER diagram with additional relations between these types. For instance, the domain expert may add a direct "acted_with" relation between two actors instead of relying on an indirect chain through a common movie. Alternatively, the IMDb® dataset may be used as a backend to a site focused specifically on the musical scores and composers of movies. In this case, a domain expert may add additional relations between composers and other entities such as a "composed_for" relation between a composer and a producer. The addition of these supplementary relations increases the importance of the entities being linked and increases the likelihood that an element of this type will be chosen for visualization.

As also discussed above, ER modeling may be utilized to produce a semantic data model. Hence, and in accordance with various embodiments, an ER diagram (i.e. ontology) is converted into a directed weighted semantic graph $G=\{E, R, W\}$, where the nodes E represent entities, edges R represent relationships between any two entities, and weights W represents the weights of a given entity-relationship pair. Weights of the nodes and edges of the graph are initially assigned a value of zero. Weights for kernels (i.e., rows of a table returned by an input query), are determined by three values, namely global weight g, graph centrality c and local consistency l.

The global weight g represents the general importance of a particular type of entity (e.g., actor, movie) to the dataset as a whole. An approximation of g may automatically be calculated by simply counting the number of relations in which each entity type participates. Alternatively, results that are better targeted to specific tasks may be achieved by allowing a domain expert to manually set these weights. As the number of entity types in a given dataset is typically quite small, this does not impose an undue burden on the domain expert and allows the domain expert the opportunity to tweak the results to match the goals of a particular database deployment.

The second factor, c, is a measure of each individual data elements importance to the data and may be thought of as a scaling factor for the g values. This measure is calculated using one of the centrality algorithms described below. The combined g·c score is used to determine the relevance of each individual data element to the complete weighted semantic graph. To explain these measures, a scenario may be considered where two people named "Spelling" occur in the weighted semantic graph, where one entity is "Tori Spelling," an actress, and the other entity is "Aaron Spelling," a prominent producer. The actor entity type is likely to have a higher global weight g than the producer is likely to have. However, the producer entity centrality may be considerably higher than the actor entity, and so the producer entity's combined g·c value can correctly identify the producer entity as being more relevant to the data.

The measure l is a measure of the local strength of the connection between two data elements. For a given entity e, an l-score may be computed for all elements e' in a neighborhood of e by considering both the degree of the connection between e and e', as well as the degree to which e' acts as a "bridge" for linking e to other elements. That is, l may be equal to the number of paths from e to e', weighted by the inverse of their length, plus the number of paths from e to each neighbor f of e', such that the shortest path from e to f includes e' again weighted by the inverse of path length.

The first part of the l-score measures the strength of the connection from e to e'. That is, an element which participates directly with e in a large number of relationships should be considered more valuable than one which participates in only a few or none at all. However, if a particular entity is reachable in a large number of ways, but not directly connected to e, it may allow a more intuitive visualization than an element which is connected weakly, albeit directly to e. The second half of the l-score is a measure of how much e' improves on the connectivity of e. For instance, an applicable scenario may be a collection of text messages between two people, Alice and Bob. Each message between the two people participates directly in exactly one relationship with each of them. Therefore, to differentiate between the various messages the keywords of each message may be considered. Thus, the second half of our 1-score will tend to favor messages with frequently used keywords and so only the most relevant messages may be selected.

The global significance of particular entities is estimated with a current-flow betweenness algorithm. A commonly used tool in the analysis of social networks is what is referred to as "betweenness." Betweenness is a measure of the degree to which a vertex lies on paths through a network. The paths considered are usually shortest paths between pairs of vertices, although a current-flow measure of betweenness allows for longer paths to contribute. However, shortest paths are still favored. This more closely matches an intuitive sense of how information flows through social networks. It should be noted that the current-flow betweenness of a vertex v may also be interpreted as the probability that v is reached on a certain type of random walk.

Figure 3:
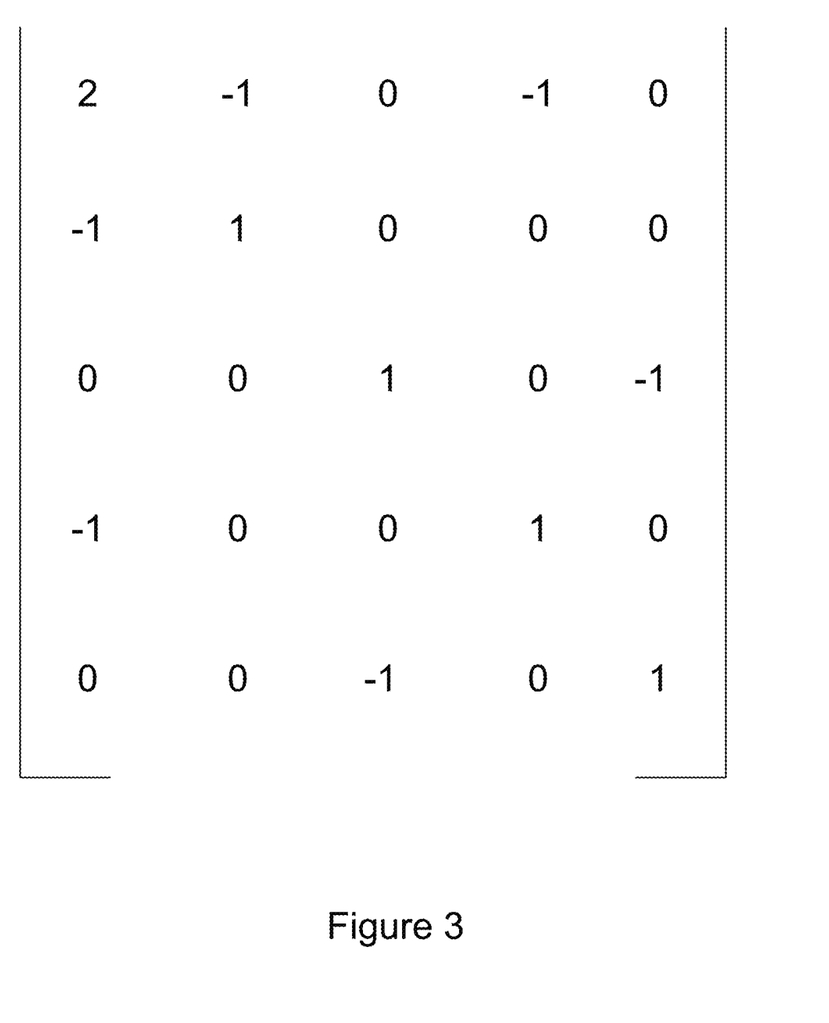
FIG. 3 illustrates an exemplary matrix utilized for weighting nodes in an ER graph in accordance with one embodiment.

In accordance with various embodiments, current-flow betweenness is computed by considering the weighted semantic graph to be an electrical network where current may enter the graph at a source node s and leave it at a sink t. The edges between vertices act as resistors and all edges are assumed to have a resistance of 1. L is the Laplacian matrix of the weighted semantic graph defined as D-A, where D is a diagonal matrix whose elements are the degree of each vertex and A is the adjacency matrix of the weighted semantic graph. One vertex v0 is assigned to have a potential of 0, and the matrix Lv is constructed by removing its row and column from the L Laplacian matrix. The resulting matrix Lv then becomes nonsingular, and a matrix, such as that illustrated in FIG. 3, is constructed.

Absolute potentials, $V_{st}$, may then be determined for all vertices for a given source s and sink t with the formula, $V=T_v^{-1}S$, where S is a vector containing a 1 in position i if current enters the network at $v_i$, -1 if current leaves the network at $v_i$, and 0 otherwise. Assuming that each link is of unit resistance, the current flowing through any vertex v is given by half of the absolute sum of potential differences between v and its neighbors as shown in the following expression.

$$I_i^{st} = \frac{1}{2} \sum_{v_j s \cdot t \cdot (v_i, v_j) \in E} |V_i^{st} - V_j^{st}|$$

The weight of each node in the ER diagram is then computed as the following:

$$w(v_i) = \frac{\sum_{s<t} I_i^{st}}{\frac{1}{2}n(n-1)},$$

where $$\frac{1}{2}n(n-1)$$

is a normalizing factor.

When a user enters a search query, each term of the query is matched against the attribute data of each entity yielding a set of potentially relevant entities. A set of kernels is then constructed by merging relevant entities that share a direct relationship. It should be noted that these kernels need not contain only a single data element. For instance, a search for a common word or name such as "Bill" may return entities that share a direct relationship. Therefore, both the individual data elements as well as the kernel comprised of the entire connected set are entered into the kernel list for consideration. This list is then ordered by kernel size (kernels with multiple elements have priority), and is of a configurable size. Within a particular size bucket, kernels are ordered by the sum of weighted global importance (g·c) as described above.

After computing the weighting for the entities and relationships (i.e., kernels) in a given ontology schema, imagery is retrieved from one or more relevant image sources (e.g., personal homepages, Flickr®, etc.) that serve as input to constructing a final composited image in the visual search results. That is, depending on configurable parameters/desired operation, images corresponding to, e.g., the three kernels with the greatest weighted global importance in the bucket are retrieved. Additionally, and in accordance with one embodiment, WordNet® or some other lexical database or word repository may accessed to enhance image retrieval. That is, using Wordnet's synonyms, hypernym, holonyms, etc., an image query may be expanded. Additionally, WordNet® may also be utilized to compute the similarity between a given input query and corresponding metadata associated with the image. Hence, more relevant imagery associated with a particular input query may be achieved.

Entities and relations not explicitly matched by the query terms are penalized slightly and correspondingly marginalized in a final visualization, i.e., composited image. Such an approach allows those entities and relations specifically requested by a user to maintain visual primacy in a composite image, but still allows for useful contextual embellishment. The type of actual visualization may be provided by, e.g., artists, as xml templates (i.e., the domain-specific visual templates described above) that can be populated with information based on the computed weighting scheme in accordance with various embodiments.

Figure 4A:
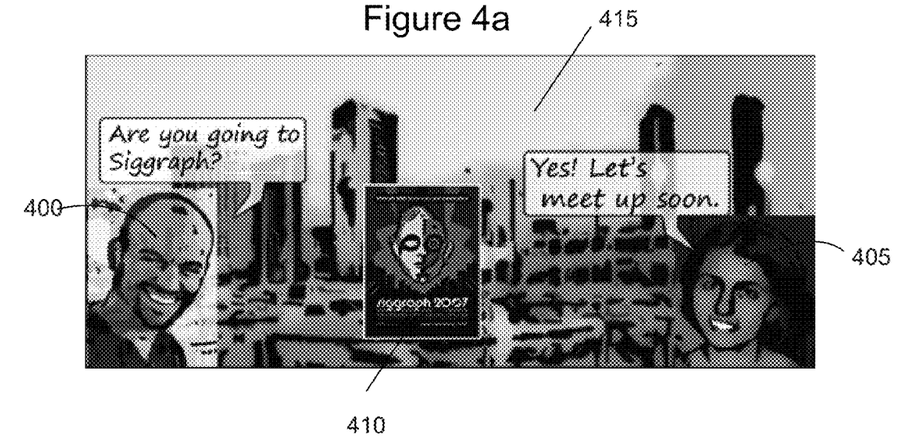
FIGS. 4a and 4b illustrate exemplary visual compositions based on ER weighting in accordance with various embodiments.
Figure 4B:
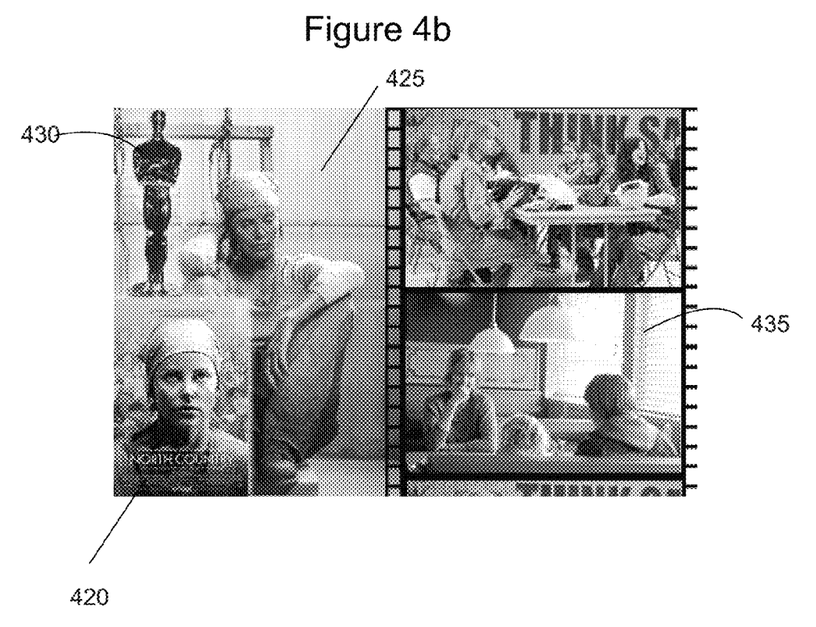

FIGS. 4a and 4b are exemplary final composited images created in accordance with various embodiments. FIG. 4a illustrates one composited image based on ER weighting applied in a text message data context. For example, person 400 may be text messaging person 405 regarding attending a conference referred to as "Siggraph." As described previously, a message relation would then exist between persons 400 and 405. Thus, the database system in accordance with one embodiment may composit an image of each of the persons 400 and 405 engaged in a conversation as illustrated in FIG. 4a. Alternatively, an input query may be initiated for the event entity, Siggraph. The resulting composited image may then be made up of a Siggraph poster 410 and a skyline of the city 415 in which the event will take place. Further still, and as described previously, FIG. 4a may be thought of as a composited image where the persons 400 and 405 are the primary visual focus, with the event and city entities/relations are marginalized.

FIG. 4b illustrates another exemplary final composited image, such as a movie poster, based on ER weighting from the IMDb®. For example, a user may query the IMDb® for the term/name "North County." The IMDb® may match the term/name North Country with a movie entity by the same name. Utilizing ER weighting as described herein, relevant images indicative of the movie entity/related entities/relationships are discovered and utilized to compose the movie poster. Thus, the move poster illustrated in FIG. 4b includes an official movie poster image 420, an image 425 of a heavily weighted and related actor entity, Charlize Theron, the starring actor. The movie poster of FIG. 4b may also include a visual of an Oscar award 430, which the actor Charlize Theron won for her role in the movie, and additional movie stills 435 from the movie.

Various embodiments provide a tool for connecting database experts and visual artists with a better understanding of the vast amounts of connected data through an ER diagram. Additionally, various embodiments provide a weighting scheme for prioritizing and organizing entities and relationships based on relevance to an input query to a database. Further still, digital artists are allowed the opportunity to provide templates marked up in XML for populating visual search results from an ER database.

Figure 5:
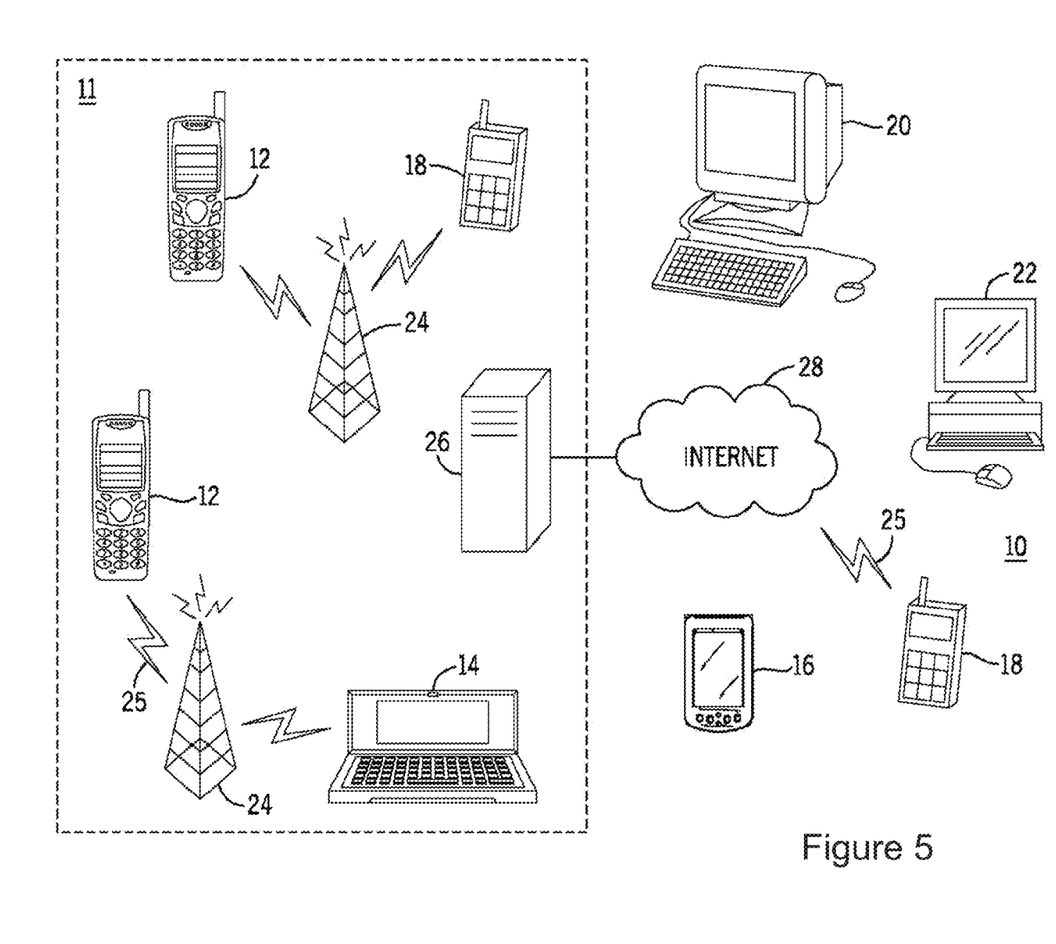
FIG. 5 is an overview diagram of a system within which various embodiments may be implemented.

FIG. 5 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, an electronic user device 12, in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 6:
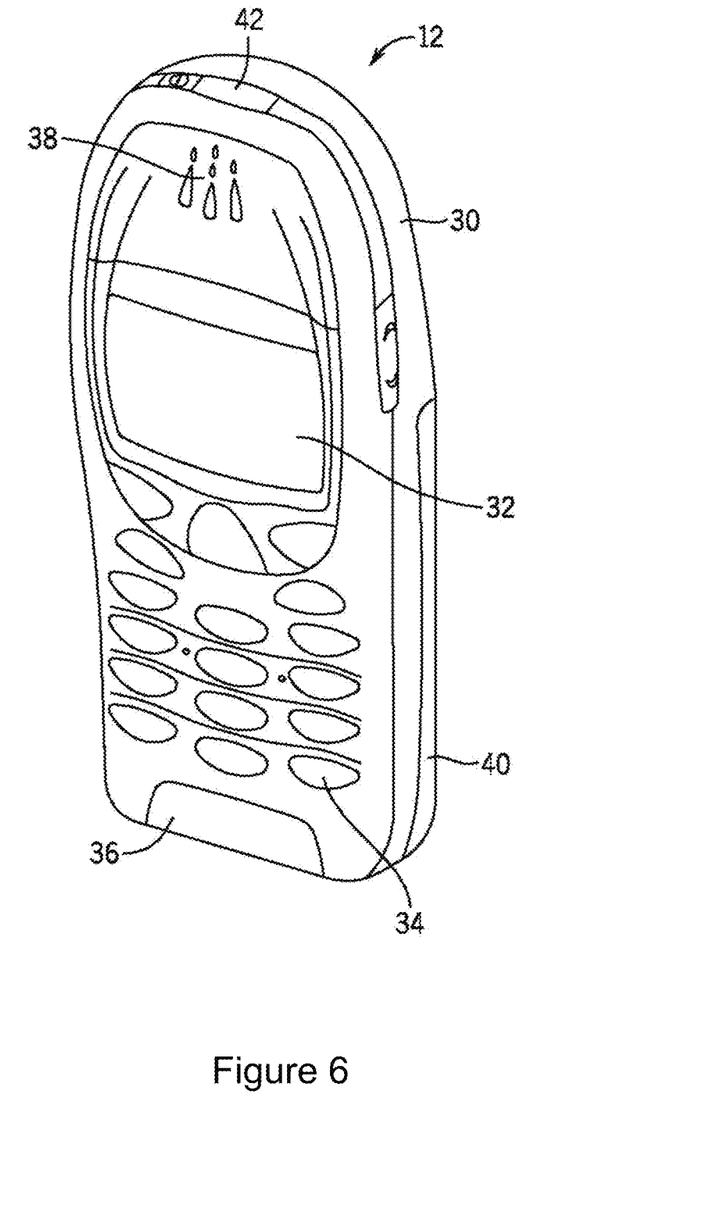
FIG. 6 is a perspective view of an electronic device that can be used in conjunction with the implementation of various embodiments.
Figure 7:
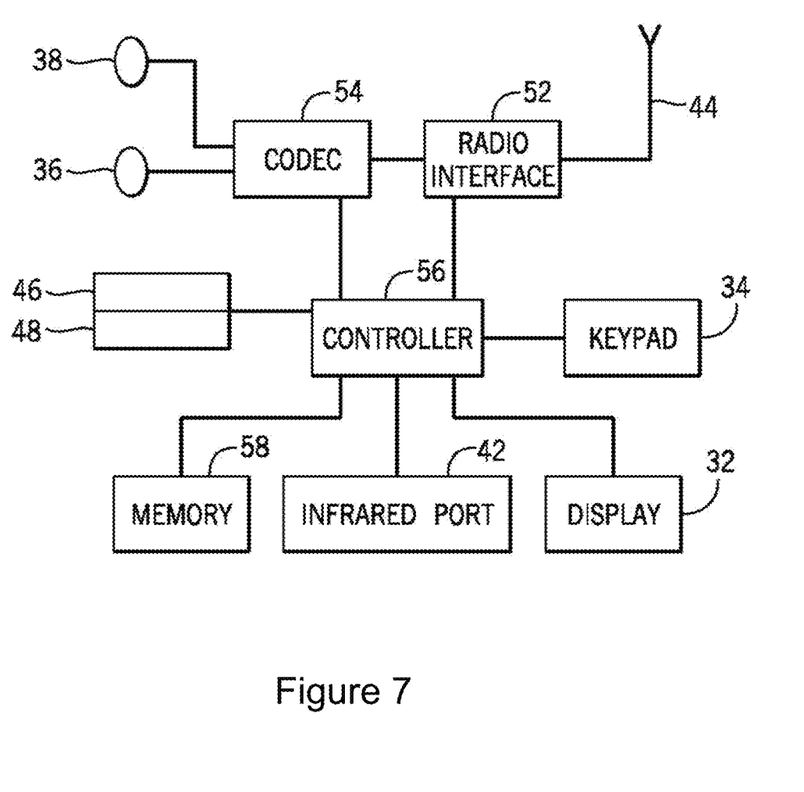
FIG. 7 is a schematic representation of the circuitry which may be included in an exemplary electronic device which may be utilized in accordance with various embodiments.

FIGS. 6 and 7 show one representative electronic device 12 within which the present invention may be implemented, where the device can detect a memory tag as described previously, and provide sensory feedback to a user in accordance with various embodiments. It should be understood, however, that the present invention is not intended to be limited to one particular type of device. The electronic device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller/processor 56 and a memory 58. The above-described components enable the electronic device to send/receive various messages to/from other devices that may reside on a network in accordance with the various embodiments of the present invention. It should be noted that the controller/processor 56 and/or another processor along with related circuitry/elements may be utilized to effectuate various embodiments by detecting NFC tags and executing program code/parameters to generate sensory feedback. Individual circuits and elements are all of a type well known in the art, for example in the Nokia range of mobile telephones.

Various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 7. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising:
    locating at least one data element matching a user query of a predefined relational database;
    extending results of the user query with weighted relevant data elements, the weighted relevant data elements being data elements having been identified as relevant based on participation in one or more relationships in which the at least one data element participates in the predefined relational database, and provided a relative weighting according to a degree of relationship to the at least one data element;
    prior to the locating of the at least one data element, calculating global weights and centrality scores for entities of the predefined relational database, wherein each entity comprises a data element;
    locating images for a result set, at least one image representative of the at least one data element matching the user query and at least one image representative of the one or more weighted data elements; and
    creating, using the images located for the result set, a composited image, the composited image created using at least one domain-specific visual template, the composited image comprising the at least one image representative of the at least one data element matching the user query and the at least one image representative of the one or more weighted relevant data elements,
    wherein the composited image rendered such that the at least one image representative of the at least one data element matching the user query having visual primacy and the at least one image representative of the one or more weighted data elements being marginalized in accordance with the relative weighting of the relevant data elements, and
    wherein the at least one image representative of the one or more weighted relevant data elements not explicitly matched by the user query, identified as relevant due to being located via the extension of the user query, and having the relative weighting subsequently penalized accordingly, causing marginalization in the composited image and enabling the at least one image representative of the at least one data element matching the user query to maintain visual primacy in the composited image.

2. The method of claim 1, wherein the domain-specific visual template comprises an Extensible Markup Language template.

3. The method of claim 1, wherein the predefined relational database is modeled utilizing an entity-relationship diagram comprising each entity of the predefined relational database and relationships representative of associations between at least two entities of the predefined relational database.

4. The method of claim 3, further comprising, converting the entity-relationship diagram into a semantic graph to allow the calculating of the global weights and the centrality scores.

5. The method of claim 1, wherein the locating of the images for the result set comprises retrieving imagery associated with the at least one data element from at least one of the predefined relational database and an external database.

6. The method of claim 1, wherein the relevant data elements comprise data elements not exactly matching the user query.

7. The method of claim 1, further comprising accessing a lexical database to enhance the locating of the images for the result set.

8. The method of claim 1, wherein the creation of the composited image comprises creating visual primacy utilizing the located images representative of the at least one data element matching the user query and contextual embellishment utilizing the located images representative of the relevant data elements not exactly matching the user query.

9. A computer program product comprising a non-transitory computer readable storage medium including computer executable instructions, the computer executable instructions, which when executed by a processor, cause an apparatus to perform the method of claim 1.

10. An apparatus, comprising:
    at least one processor; and
    at least one memory including computer program code, the at least one memory and the computer program code configured to, with the at least one processor, cause the apparatus to perform at least the following:
        locate at least one data element matching a user query of a predefined relational database;
        extend results of the user query with weighted relevant data elements, the weighted relevant data elements being data elements having been identified as relevant based on participation in one or more relationships in which the at least one data element participates in the predefined relational database, and provided a relative weighting according to a degree of relationship to the at least one data element;
        prior to the locating of the at least one data element, calculate global weights and centrality scores for entities of the predefined relational database, wherein each entity comprises a data element;
        locate images for a result set, at least one image representative of the at least one data element matching the user query and at least one image representative of the one or more weighted data elements; and
        create, using the located images, a composited image, the composited image created using at least one domain-specific visual template, the composited image comprising the at least one image representative of the at least one data element matching the user query and the at least one image representative of the one or more weighted relevant data elements,
    wherein the composited image rendered such that the at least one image representative of the at least one data element matching the user query having visual primacy and the at least one image representative of the one or more weighted relevant data elements being marginalized in accordance with the relative weighting of the relevant data elements,
    wherein the at least one image representative of the one or more weighted relevant data elements not explicitly matched by the user query, identified as relevant due to being located via the extension of the results of the user query, and having the relative weighting subsequently penalized accordingly, causing marginalization in the composited image and enabling the at least one image representative of the at least one data element matching the user query to maintain visual primacy in the composited image.

11. The apparatus of claim 10, wherein the domain-specific visual template comprises an Extensible Markup Language template.

12. A method, comprising:

representing a predefined relational database utilizing an entity-relationship diagram for matching attribute data from a user query to weighted relevant data elements, the weighted relevant data elements being data elements having been identified as relevant based on participation in one or more relationships in which an at least one data element participates, the at least one data element located based on matching the user query of the predefined relational database, and provided a relative weighting according to a degree of relationship to the at least one data element;

prior to the locating of the at least one data element, calculating global weights and centrality scores for each entity of the predefined relational database, wherein each entity comprises a data element; and utilizing domain-specific visual templates for creating a composited image in response to a user query of the predefined relational database using the images located for the result set, the composited image created using at least one domain-specific visual template, the composited image comprising at least one image representative of the at least one data element matching the user query and at least one image representative of the one or more weighted relevant data elements, wherein the composited image rendered such that the at least one image representative of the at least one data element matching the user query having visual primacy and the at least one image representative of the one or more weighted relevant data elements being marginalized in accordance with the relative weighting of the relevant data elements, and wherein the at least one image representative of the one or more weighted relevant data elements not explicitly matched by the user query, identified as relevant due to being located via the extension of the results of the user query, and having the relative weighting subsequently penalized accordingly, causing marginalization in the composited image and enabling the at least one image representative of the at least one data element matching the user query to maintain visual primacy in the composited image.

13. The method of claim 12, wherein the domain-specific visual template comprises an Extensible Markup Language template.

14. The method of claim 12, wherein the predefined relational database comprises a plurality of entities and relationships representative of associations between at least two entities of the plurality of entities.

15. A computer program product comprising a non-transitory computer readable storage medium including computer executable instructions, the computer executable instructions, which when executed by a processor, cause an apparatus to perform the method of claim 12.

16. An apparatus, comprising:

at least one processor; and at least one memory including computer program code, the at least one memory and the computer program code configured to, with the at least one processor, cause the apparatus to perform at least the following:

represent a relational database utilizing an entity-relationship diagram for matching attribute data from a user query to weighted relevant data elements, the weighted relevant data elements being data elements having been identified as relevant based on participation in one or more relationships in which an at least one data element participates, the at least one data element located based on matching the user query of the predefined relational database, and provided a relative weighting according to a degree of relationship to the at least one data element;

prior to the locating of the at least one data element, calculate global weights and centrality scores for each entity of the relational database, wherein each entity comprises a data element; and utilize domain-specific visual templates for creating a composited image in response to a user query of the relational database using the images located for the result set, the composited image created using at least one domain-specific visual template, the composited image comprising at least one image representative of the at least one data element matching the user query and at least one image representative of the one or more weighted relevant data elements, wherein the composited image rendered such that the at least one image representative of the at least one data element matching the user query having visual primacy and the at least one image representative of the one or more weighted relevant data elements being marginalized in accordance with the relative weighting of the relevant data elements, and wherein the at least one image representative of the one or more weighted relevant data elements not explicitly matched by the user query, identified as relevant due to being located via the extension of the results of the user query, and having the relative weighting subsequently penalized accordingly, causing marginalization in the composited image and enabling the at least one image representative of the at least one data element matching the user query to maintain visual primacy in the composited image.

* * * * *